United States Patent
Komatsu

(10) Patent No.: US 7,641,114 B2
(45) Date of Patent: Jan. 5, 2010

(54) AUTHENTICATION SYSTEM, AUTHENTICATION METHOD, AND ENTRANCE/EXIT MANAGEMENT SYSTEM

(75) Inventor: Hitoshi Komatsu, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 703 days.

(21) Appl. No.: 11/397,797

(22) Filed: Apr. 5, 2006

(65) Prior Publication Data

US 2006/0219778 A1 Oct. 5, 2006

(30) Foreign Application Priority Data

Apr. 5, 2005 (JP) ............................. 2005-108908

(51) Int. Cl.
*G06K 5/00* (2006.01)
*G06K 7/01* (2006.01)
*G06K 19/00* (2006.01)

(52) U.S. Cl. ...................... 235/382; 235/382.5; 340/5.2

(58) Field of Classification Search ................ 235/382, 235/382.5, 380, 486, 492; 340/5.2; 380/247, 380/277, 258; 713/168, 186, 163

See application file for complete search history.

(56) References Cited

U.S. PATENT DOCUMENTS

| | | | | |
|---|---|---|---|---|
| 3,984,658 A * | 10/1976 | Cannon | ...................... | 235/382 |
| 4,036,430 A * | 7/1977 | Eppich | ........................ | 235/454 |
| 4,097,727 A * | 6/1978 | Ulch | ........................... | 235/382 |
| 4,176,783 A * | 12/1979 | Eppich | ........................ | 235/474 |
| 4,346,290 A * | 8/1982 | Rossi | .......................... | 235/436 |
| 4,677,284 A * | 6/1987 | Genest | ....................... | 235/487 |
| 4,752,678 A * | 6/1988 | Rikuna | ....................... | 235/380 |
| 4,928,001 A * | 5/1990 | Masada | ....................... | 235/380 |
| 5,159,183 A * | 10/1992 | Yamaguchi | ................. | 235/492 |
| 5,763,862 A * | 6/1998 | Jachimowicz et al. | ........ | 235/380 |
| 6,178,409 B1 * | 1/2001 | Weber et al. | ................... | 705/79 |
| 6,991,172 B2 * | 1/2006 | Luu | ........................... | 235/492 |
| 7,036,738 B1 * | 5/2006 | Vanzini et al. | .............. | 235/486 |
| 7,124,943 B2 * | 10/2006 | Quan et al. | .................. | 235/451 |
| 7,284,125 B2 * | 10/2007 | Hashimoto et al. | .......... | 713/168 |
| 2001/0015692 A1 * | 8/2001 | Takanori et al. | ............ | 340/5.23 |
| 2004/0128508 A1 * | 7/2004 | Wheeler et al. | ............. | 713/170 |

(Continued)

FOREIGN PATENT DOCUMENTS

EP 1 190 399 3/2002

(Continued)

OTHER PUBLICATIONS

Australian Search Report dated Feb. 6, 2007 for Singapore Appln. No. 200601943-4.

(Continued)

*Primary Examiner*—Thien M. Le
*Assistant Examiner*—Thien T Mai
(74) *Attorney, Agent, or Firm*—Pillsbury Winthrop Shaw Pittman, LLP

(57) ABSTRACT

A system including first and second IC cards and a host device adopts a communication mode in which the host device communicates with the first IC card only, and the first IC card communicates with the second IC card. The host device acquires inherent information encrypted by the first and second IC cards via the first IC card, decrypts the inherent information encrypted by the first and second IC cards, and collates the decrypted information with the inherent information to thereby authenticate the first and second IC cards.

11 Claims, 8 Drawing Sheets

U.S. PATENT DOCUMENTS

2005/0060555 A1* 3/2005 Raghunath et al. .......... 713/186
2005/0105731 A1* 5/2005 Basquin ..................... 380/247
2005/0242921 A1* 11/2005 Zimmerman et al. ......... 340/5.2

FOREIGN PATENT DOCUMENTS

| JP | 2003-150553 | 5/2003 |
|---|---|---|
| WO | WO 00/75883 | 12/2000 |

OTHER PUBLICATIONS

European Search Report dated Aug. 25, 2006 for Appln. No. 06006148.8-2413.

* cited by examiner

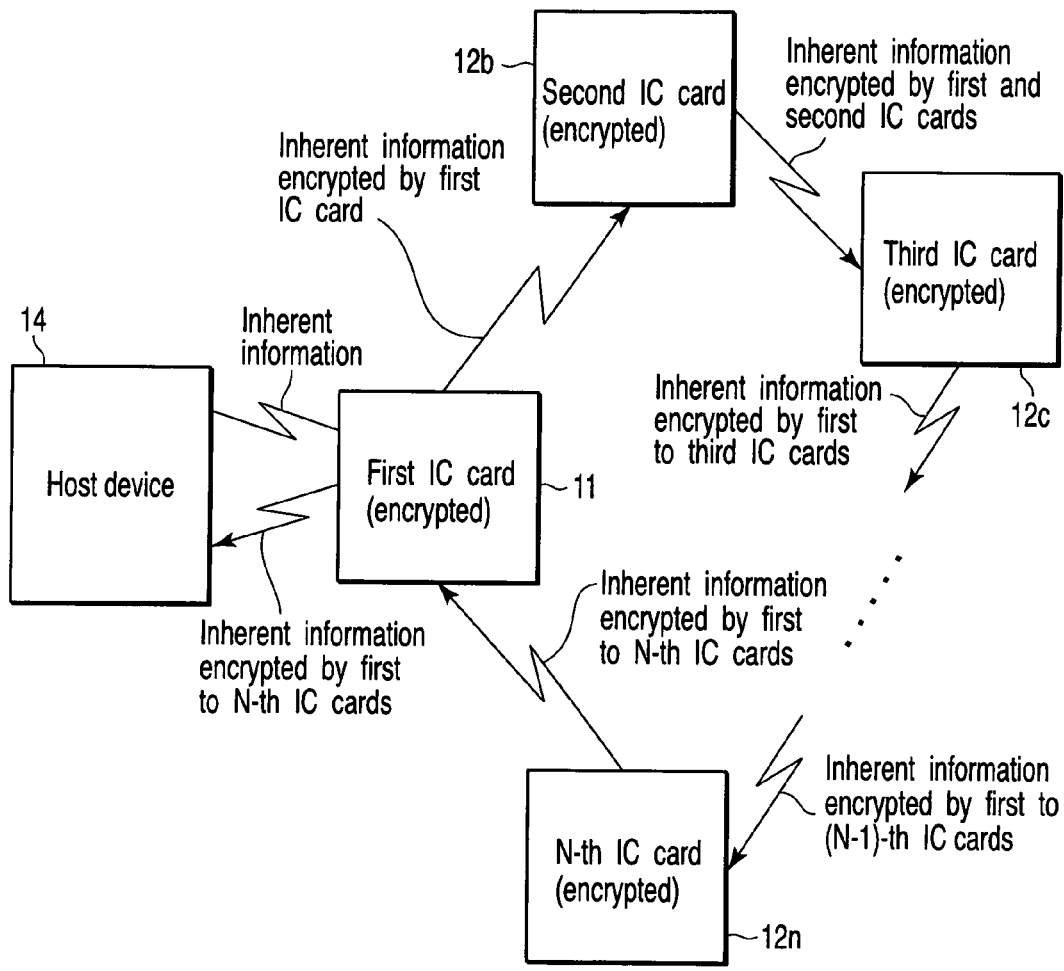
F I G. 8

AUTHENTICATION SYSTEM, AUTHENTICATION METHOD, AND ENTRANCE/EXIT MANAGEMENT SYSTEM

CROSS-REFERENCE TO RELATED APPLICATIONS

This application is based upon and claims the benefit of priority from prior Japanese Patent Application No. 2005-108908, filed Apr. 5, 2005, the entire contents of which are incorporated herein by reference.

BACKGROUND OF THE INVENTION

1. Field of the Invention

The present invention relates to an authentication system, an authentication method, and an entrance/exit management system in which authentication is performed using, for example, a plurality of IC cards.

2. Description of the Related Art

In recent years, to realize sophisticated security, it has been proposed that authentication be performed using a plurality of IC cards (e.g., contact-less IC cards) in an authentication system, an authentication method, or an entrance/exit management system. For example, as an entrance/exit management system in which the entrance/exit is permitted on conditions that the authentications of the plurality of IC cards are successful, there is a system in which person's entrance/exit is managed by performing processing to authenticate the plurality of IC cards. For example, in Jpn. Pat. Appln. KOKAI Publication No. 2003-150553, an authentication system is proposed in which a plurality of IC cards and a terminal device perform authentication processing to thereby make possible the sophisticated security in a computer network.

However, in the technology described in Jpn. Pat. Appln. KOKAI Publication No. 2003-150553, the terminal device has to communicate with each of the plurality of IC cards for each authentication processing. In the technology described in Jpn. Pat. Appln. KOKAI Publication No. 2003-150553, the terminal device has to manage various information for performing the authentication processing on all the IC cards.

BRIEF SUMMARY OF THE INVENTION

In an aspect of the present invention, an object is to provide an authentication system, an authentication method, and an entrance/exit management system in which an efficient operation is performed.

In a first aspect of the present invention, there is provided an authentication system comprising: a first electronic device; a second electronic device; and a host device, the first electronic device including: a first memory which stores first key information; a first encryption processing section which encrypts inherent information transmitted from the host device by use of the first key information stored in the first memory; a first transmitting section which transmits to the second electronic device the inherent information encrypted with the first key information by the first encryption processing section; and a transfer section which transfers to the host device information transmitted from the second electronic device and obtained by encrypting the inherent information encrypted with the first key information further by the second electronic device, the second electronic device including: a second memory which stores second key information; a second encryption processing section which encrypts the inherent information transmitted from the first electronic device and encrypted with the first key information by use of the second key information stored in the second memory; and a second transmitting section which transmits to the first electronic device the information encrypted with the second key information by the second encryption processing section, the host device including: a storage section which stores key information for decryption in association with the first electronic device; a third transmitting section which transmits the inherent information to the first electronic device; a decryption processing section which decrypts information transferred from the first electronic device and obtained by encrypting the inherent information by the first and second electronic devices by use of the decryption key information stored in association with the first electronic device in the storage section; and an authentication processing section which authenticates the first and second electronic devices based on the information decrypted by the decryption processing section and the inherent information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is an explanatory view showing a processing example based on a first method for authenticating three or more IC cards by a host device.

DETAILED DESCRIPTION OF THE INVENTION

An embodiment of the present invention will be described hereinafter with reference to the drawings.

Figure 1:
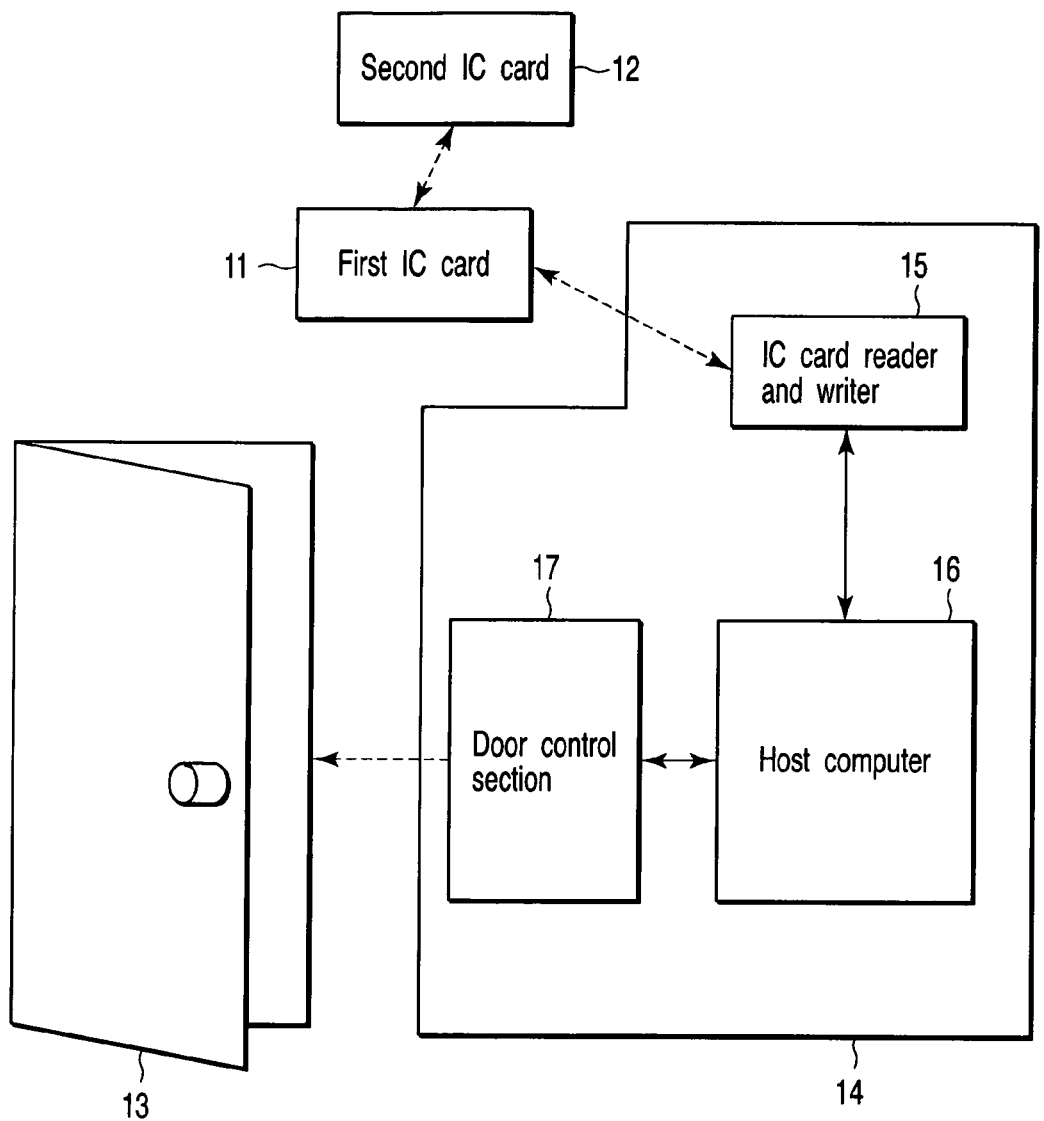
FIG. 1 is a block diagram schematically showing a constitution example of an entrance/exit management system to which an authentication system and an authentication method are applied.

FIG. 1 schematically shows a constitution example of an entrance/exit management system.

The entrance/exit management system shown in FIG. 1 includes: a first IC card (portable electronic device) 11; a second IC card (portable electronic device) 12; a door 13; a host device 14 and the like. The entrance/exit management system manages entrance/exit with respect to a facility such as a room or an area. Here, the entrance/exit management system permits entrance or exit of a specific person on conditions that authentications of a plurality of IC cards are successful in order to realize sophisticated security.

It is assumed that a user who utilizes the facility managed by the entrance/exit management system possesses the first IC card 11. The first IC card 11 is constituted of a contact-less IC card. The first IC card 11 functions as a first authentication medium.

It is assumed that a user who utilizes the facility managed by the entrance/exit management system possesses the second IC card 12. It is to be noted that the second IC card 12 may be possessed by a user who is different from the user of the first IC card 11. The second IC card 12 functions as a second authentication medium.

The door 13 is disposed in a doorway or the like of the facility managed by the entrance/exit management system. The door 13 functions as a gate for the entrance/exit. The door 13 is controlled to open and close by the host device 14. The door 13 may be provided with a lock mechanism which is controlled to unlock and lock by the host device 14.

The host device 14 controls the entrance/exit with respect to the facility managed by the entrance/exit management system. The host device 14 has a function of controlling the opening/closing of the door 13, a function of communicating with the first IC card 11 and the second IC card 12, and a function of processing various information.

Next, a constitution example of the host device 14 will be described.

As shown in FIG. 1, the host device 14 includes an IC card reader and writer 15, a host computer 16, a door control section 17 and the like.

The IC card reader and writer 15 has a function of radio-communicating with the IC cards for use as the first IC card 11 and the second IC card 12. The IC card reader and writer 15 receives data from the IC card, and transmits data to the IC card by the radio communication with the IC cards.

The host computer 16 functions as a control section of the host device 14. The host computer 16 processes various types of information based on a preset processing program or the like. For example, the host computer 16 radio-communicates with the IC card (the first IC card 11 or the second IC card 12) via the IC card reader and writer 15 to thereby authenticate the IC card (or the person who possesses the IC card. The host computer 16 controls the opening/closing of the door 13 by the door control section 17 based on an authentication result of the authentication processing of the IC card.

The door control section 17 controls the opening/closing of the door 13. The door control section 17 opens/closes the door 13 based on a control signal from the host computer 16.

Next, there will be described constitution examples of the first IC card 11 and the second IC card 12.

Figure 2:
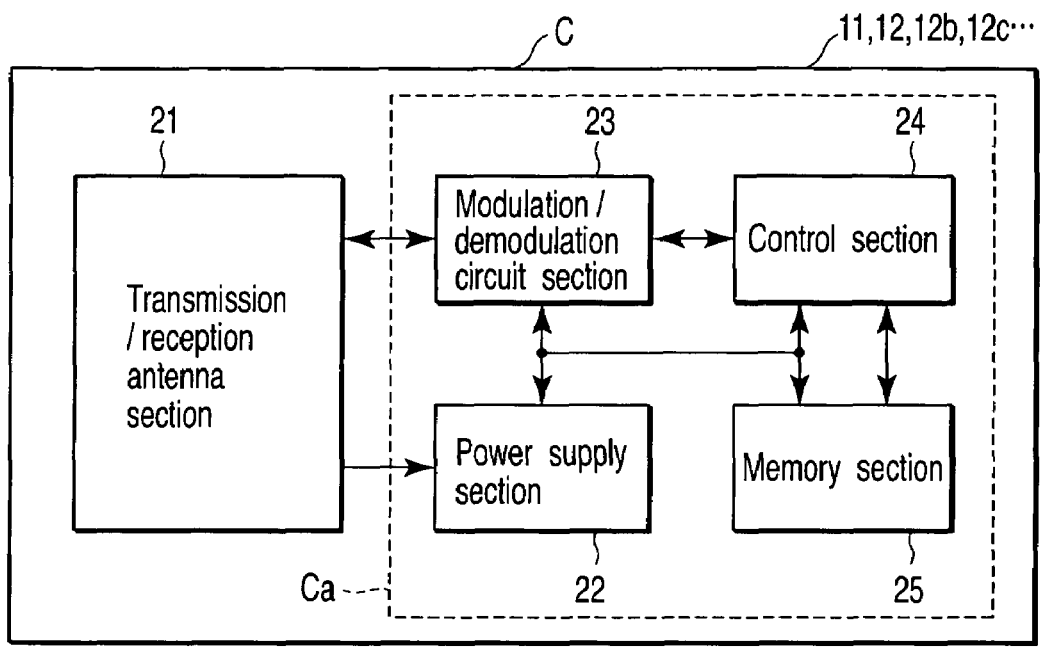
FIG. 2 is a block diagram schematically showing constitution examples of first and second IC cards.

FIG. 2 is a block diagram showing the constitution examples of the first IC card 11 and the second IC card 12.

As shown in FIG. 2, each of the first and second IC cards 11, 12 includes: a transmission/reception antenna section 21; a power supply section 22; a modulation/demodulation circuit section 23; a control section 24; a memory section 25; and the like. The power supply section 22, the modulation/demodulation circuit section 23, the control section 24, and the memory section 25 are constituted of a integrally formed module Ca. The module Ca is electrically connected to the transmission/reception antenna section 21, and they are buried in a housing C which forms each of the first and second IC cards 11, 12.

The transmission/reception antenna section 21 transmits and receives radio waves with respect to the reader and writer 15 and another IC card. For example, the transmission/reception antenna section 21 is constituted of a loop antenna or the like buried in the housing.

The power supply section 22 supplies a power to each component of the IC card 11 or 12. The IC card 11 or 12 constituted as shown in FIG. 2 is a contact-less IC card without any battery. Therefore, in the constitution shown in FIG. 2, the power supply section 22 converts the radio wave received by the transmission/reception antenna section 21 into the power to thereby generate the power to be supplied to each component.

The modulation/demodulation circuit section 23 modulates and demodulates an electric signal. The modulation/demodulation circuit section 23 converts (demodulates) an electric signal as the radio wave received by the transmission/reception antenna section 21 into digital data, or converts (modulates) the digital data for transmission into the electric signal to be transmitted as the radio wave. For example, the modulation/demodulation circuit section 23 demodulates into the digital data the electric signal as the radio wave received by the transmission/reception antenna section 21, and the section outputs the demodulated digital data to the control section 24. The modulation/demodulation circuit section 23 modulates the digital data for transmission from the control section 24 into the electric signal to be transmitted as the radio wave, and the section outputs the modulated electric signal to the transmission/reception antenna section 21.

The control section 24 controls the whole IC card. The control section 24 controls an operation of each component, or processes various information. The control section 24 performs, for example, analysis of data, control of input/output of data and the like.

The memory section 25 is constituted of a volatile memory (random access memory: RAM), a non-rewritable nonvolatile memory (read only memory: ROM), a rewritable nonvolatile memory (EEPROM, flash ROM or the like) and the like. The RAM functions as, for example, a working memory for temporarily storing various data. The ROM functions as a program memory in which, for example, a pre-stored control program, control data, a processing program or the like is stored. Various types of data or processing program is stored in the rewritable nonvolatile memory.

For example, in the rewritable nonvolatile memory, there are stored ID information, key information and the like for use in the present entrance/exit management system. The ID information is identification information for specifying each IC card in the entrance/exit management system. The ID information is information which is inherent in each IC card. The key information is for use in encryption processing in authentication processing in entrance/exit management. The key information is set with respect to each IC card. It is to be noted that in the following description, the key information stored in the memory section 25 of the first IC card 11 is referred to as first key information, and the key information stored in the memory section 25 of the second IC card 12 is referred to as second key information.

Next, there will be described a constitution example of the IC card reader and writer 15 disposed in the host device 14.

Figure 3:
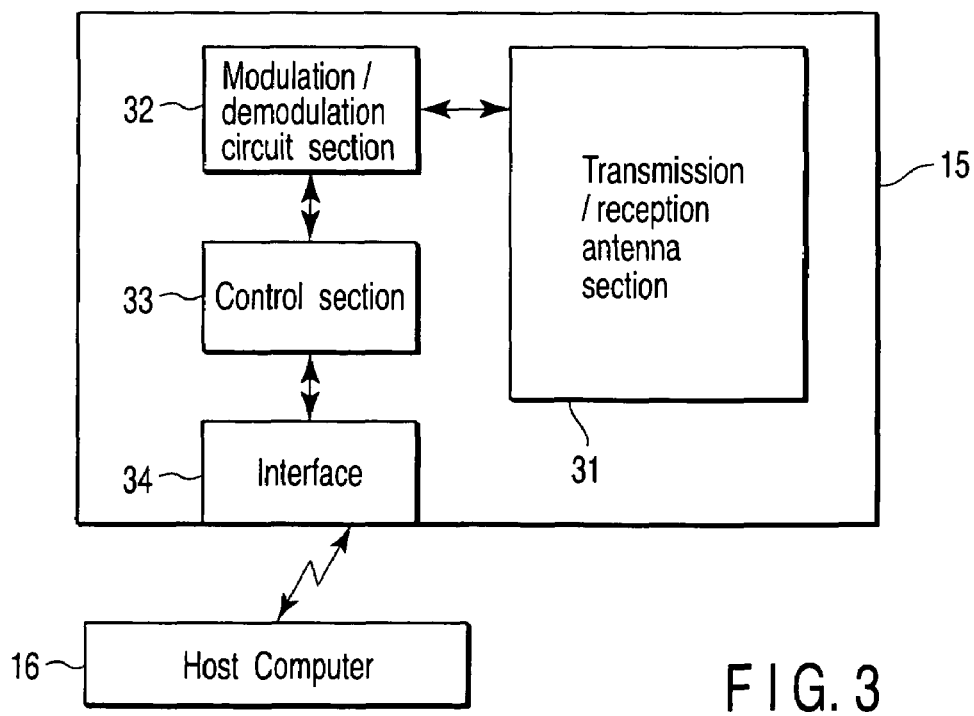
FIG. 3 is a block diagram schematically showing a constitution example of an IC card reader and writer.

FIG. 3 is a block diagram showing a constitution example of the IC card reader and writer 15.

As shown in FIG. 3, the reader and writer 15 is constituted of: a transmission/reception antenna section 31; a modulation/demodulation circuit section 32; a control section 33; an interface 34 and the like.

The transmission/reception antenna section 31 is constituted of an antenna for transmitting and receiving the radio waves. The transmission/reception antenna section 31 transmits the radio wave for communicating with the IC card, and receives the radio wave transmitted from the IC card. The modulation/demodulation circuit section 32 modulates and demodulates the electric signals. The modulation/demodulation circuit section 32 converts (demodulates) into the digital data the electric signal as the radio wave received by the transmission/reception antenna section 31, and converts (modulates) the digital data for transmission into the electric signal to be transmitted as the radio wave. For example, the modulation/demodulation circuit section 32 demodulates into the digital data the electric signal as the radio wave received by the transmission/reception antenna section 31, and outputs the demodulated digital data to the control section 33. The modulation/demodulation circuit section 23 modulates the digital data for transmission from the control section 33 into the electric signal to be transmitted as the radio wave, and outputs the modulated electric signal to the transmission/reception antenna section 31.

The control section 33 controls the whole IC card reader and writer 15. The control section 33 controls the operation of each component, or processes various information. The control section 33 performs, for example, analysis of data, control of transmission/reception of data and the like. The interface 34 is an interface to be connected to the host computer 16. The control section 33 performs data communication with the host computer 16 via the interface 34.

Next, there will be described a constitution example of the IC card reader and writer 15 disposed in the host device 14.

Figure 4:
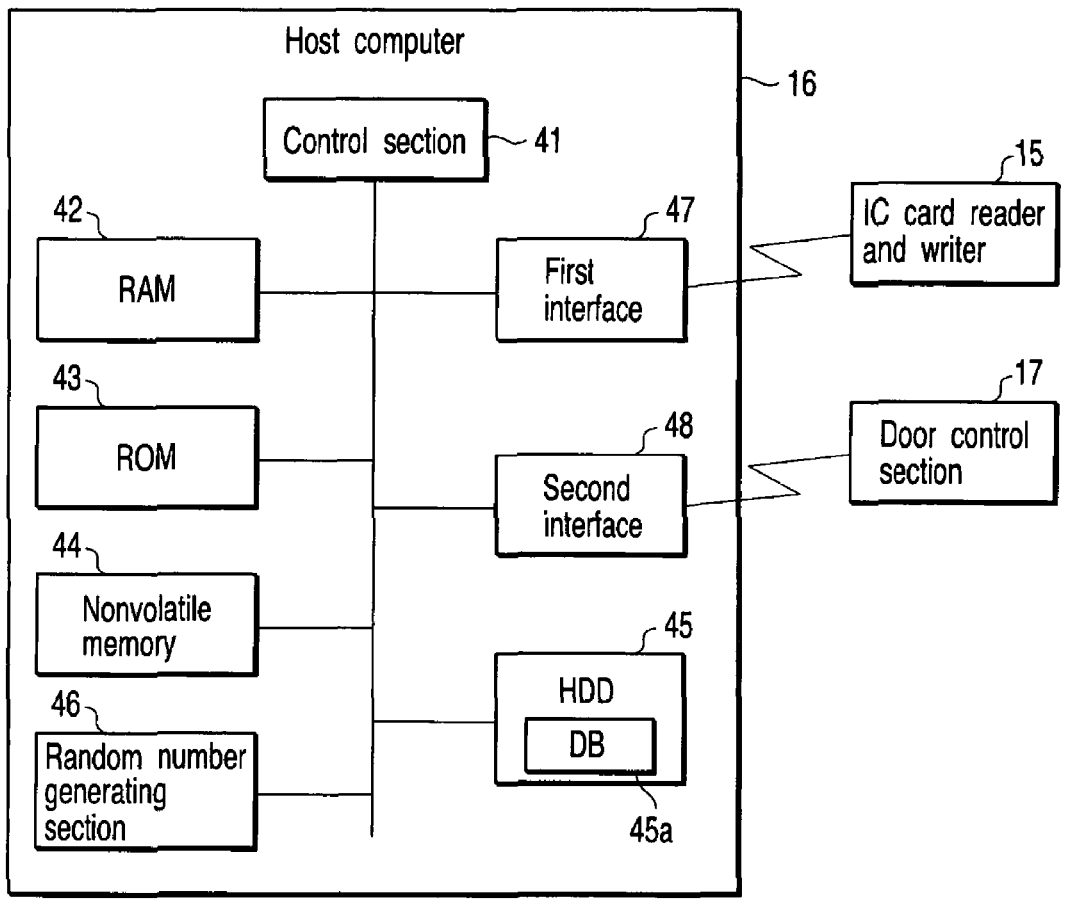
FIG. 4 is a block diagram schematically showing a constitution example of a host computer.

FIG. 4 is a block diagram showing a constitution example of the host computer 16.

As shown in FIG. 4, the host computer 16 includes: a control section 41; a RAM 42; a ROM 43; a nonvolatile memory 44; a hard disk drive (HDD) 45; a random number generating section 46; a first interface 47; and a second interface 48.

The control section 41 controls the whole host computer 16. The control section 41 is constituted of, for example, a CPU, an internal memory and the like. The control section 41 performs various processing based on the program stored in the ROM 43, the nonvolatile memory 44, or the HDD 45.

The RAM 42 is a volatile memory in which data is temporarily stored. The ROM 43 is a memory in which a control program, control data or the like is stored beforehand. The nonvolatile memory 44 is constituted of a rewritable nonvolatile memory such as an EEPROM. For example, system information or the like is stored in the nonvolatile memory 44. For example, a processing program, various types of data or the like is stored in the HDD 45. The HDD 45 includes a database (DB) 45a.

In the database 45a, there is stored information on a person which is permitted to enter or leave the facility as information for performing the entrance/exit management. In the present entrance/exit management system, there are stored at least ID information of the IC card possessed by each person and decryption key information associated with the ID information as the information on the person who is permitted to enter or leave the facility in the database 45a. In the present entrance/exit management system, it is presumed that the entrance/exit is permitted in a case where the authentications of a plurality of IC cards are successful. Therefore, the decryption key information associated with each ID information stored in the database 45a corresponds to key information set to the IC card containing the ID information, and key information set to another IC card provided simultaneously with the IC card containing the ID information.

The random number generating section 46 generates a random number for use as inherent information in the authentication processing. It is to be noted that the random number generating section 46 may be realized in a case where the control section 41 executes the processing program stored in the ROM 43, the nonvolatile memory 44, or the HDD 45.

The first interface 47 is an interface to be connected to the IC card reader and writer 15. The control section 41 performs data communication with the IC card reader and writer 15 via the first interface 47. The second interface 48 is an interface to be connected to the door control section 17. The second interface 48 outputs to the door control section 17 a control signal for opening or closing the door, the control signal being transmitted from the control section 41.

Next, there will be described a processing example of entrance/exit management in the present entrance/exit management system.

Figure 5:
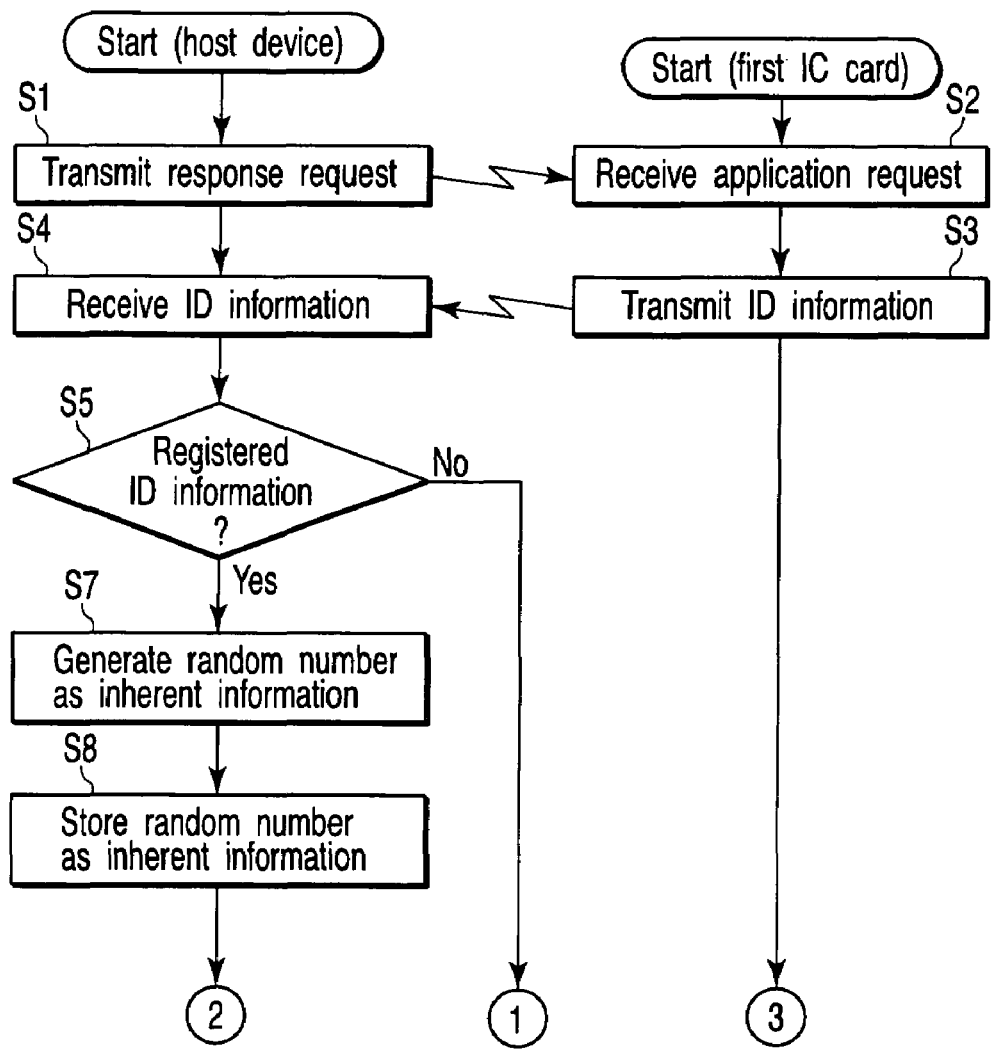
FIG. 5 is a flowchart showing a processing example of entrance/exit management.
Figure 6:
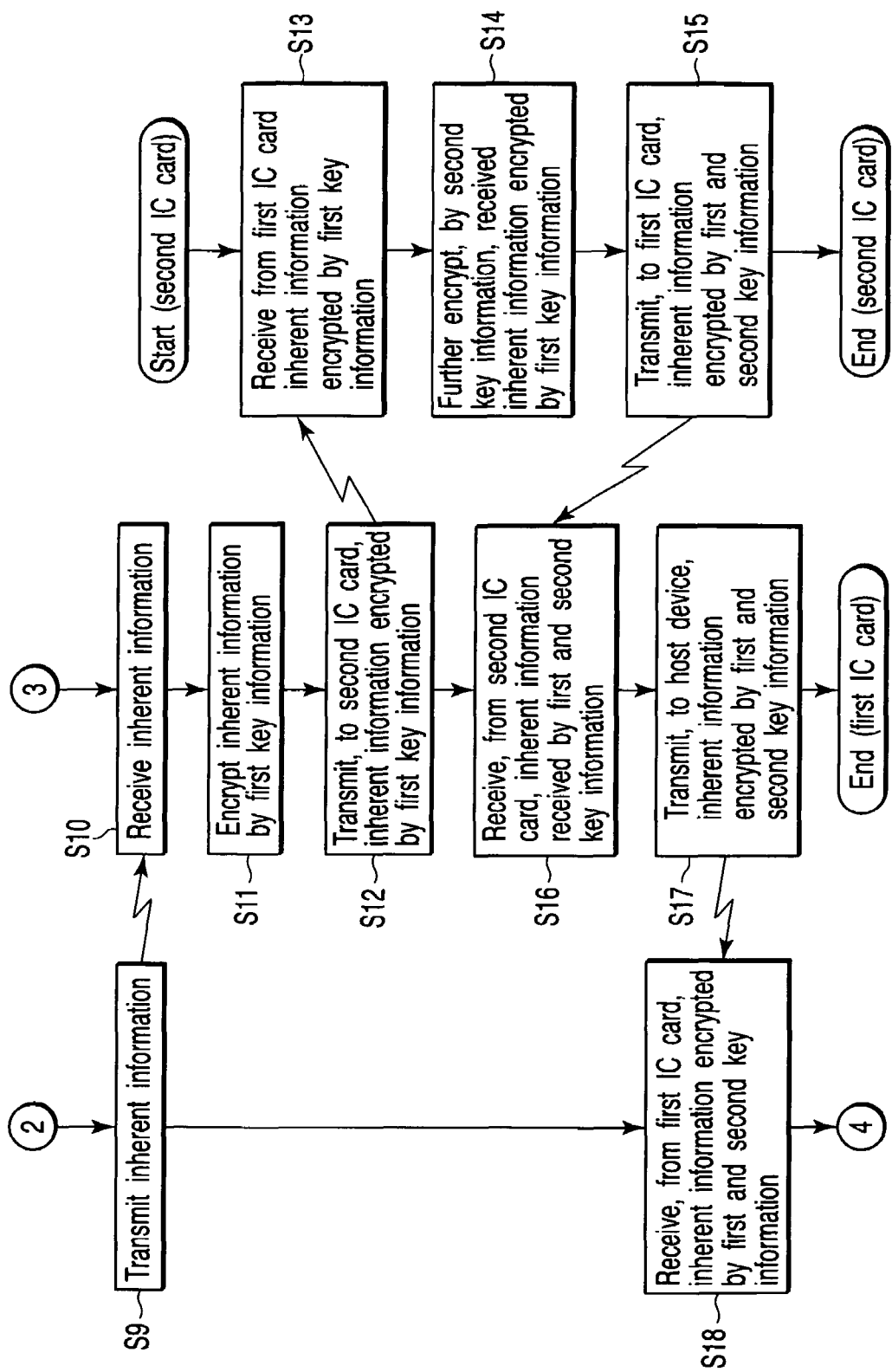
FIG. 6 is a flowchart showing a processing example of entrance/exit management.
Figure 7:
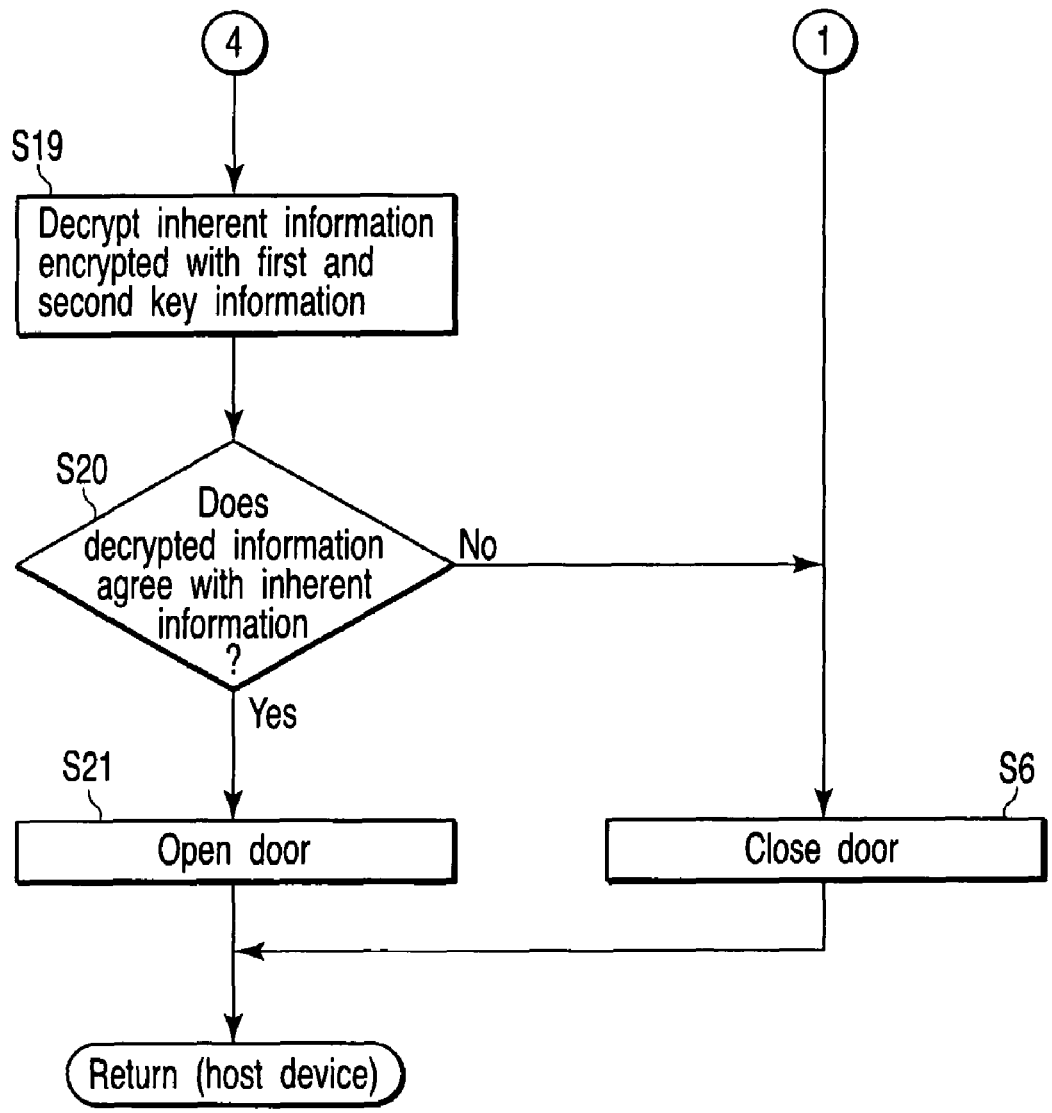
FIG. 7 is a flowchart showing a processing example of entrance/exit management.

FIGS. 5 and 6 are flowcharts showing a processing example of the entrance/exit management in the entrance/exit management system. Here, in the entrance/exit management system, conditions for operating the door 13 are that authentications of the host device 14 and a plurality of IC cards (the first IC card 11 and the second IC card 12) are successful.

First, the host device 14 transmits a response request to the IC card by the IC card reader and writer 15 (step S1). The IC card reader and writer 15 transmits, as the response request, a radio wave obtained by modulating a signal requiring the identification information (ID information).

It is assumed that the first IC card 11 is brought in an area (communication area) reached by the radio wave transmitted from the reader and writer 15 of the host device 14 in this state. Then, the radio wave transmitted from the reader and writer 15 of the host device 14 is received by the transmission/reception antenna section 21 of the first IC card 11. On receiving the radio wave from the transmission/reception antenna section 21, the power supply section 22 of the first IC card 11 generates a power in response to the electric signal supplied from the transmission/reception antenna section 21. The generated power is supplied to each component of the first IC card 11. Accordingly, the first IC card 11 is started to be ready for performing various processing.

In the first IC card 11 brought into an operative state, the radio wave received by the transmission/reception antenna section 21 is demodulated by the modulation/demodulation circuit section 23, and the demodulated data is supplied to the control section 24. Here, the ID information request transmitted from the IC card reader and writer 15 of the host device 14 is demodulated into digital data, and the data is supplied to the control section 24 (step S2).

On receiving the ID information request, the control section 24 of the first IC card 11 reads the ID information of the first IC card 11 stored (registered) beforehand in the memory section 25. When the ID information is read from the memory section 25, the control section 24 allows the modulation/demodulation circuit section 23 to modulate the digital data as the read ID information. This modulated signal (ID information) is transmitted as the radio wave by the transmission/reception antenna section 21 (step S3).

The radio wave indicating the ID information transmitted from the first IC card 11 is received by the IC card reader and writer 15 of the host device 14 (step S4). In the IC card reader and writer 15, the radio wave indicating the ID information transmitted from the first IC card is received by the transmission/reception antenna section 31.

The radio wave received by the transmission/reception antenna section 31 is demodulated by the modulation/demodulation circuit section 32, and the demodulated data (data indicating the ID information) is supplied to the control section 33. The control section 33 provided with the ID information from the first IC card 11 outputs the ID information received from the first IC card 11 to the host computer 16 via the interface 34. In the host computer 16, the ID information from the IC card reader and writer 15, which has been received from the first IC card 11, is input via the first interface 47, and once held in the RAM 42.

On receiving the ID information from the first IC card 11, the host device 14 judges whether or not the received ID information is ID information registered beforehand in the database 45*a* (step S5). In this case, the control section 41 of the host computer 16 collates the ID information received from the first IC card 11 with that registered in the database 45*a*.

In a case where it is judged that there exists, in the database 45*a*, ID information which agrees with the received ID information as a result of the collation (step S5, YES), the control section 41 of the host computer 16 judges that the first IC card 11 is an IC card registered beforehand in the database 45*a*.

Moreover, in a case where it is judged that the ID information which agrees with the received ID information as a result of the collation does not exist in the database 45*a* (step S5, NO), the control section 41 of the host computer 16 judges that the first IC card 11 is not the IC card registered beforehand in the database 45*a*. In this case, the control section 41 of the host computer 16 ends the processing while the door 13 remains closed (step S6).

Furthermore, the host device 14 which has ended the processing of the received ID information returns to the step S1, and transmits the response request. It is to be noted that in a case where it is judged that there does not exist the ID information which agrees with the received ID information in the database 45*a*, the host device 14 may inform that the authentication has failed by a display section, a speaker or the like (not shown).

Moreover, in a case where it is judged that the received ID information is registered in the database 45*a* (step S5, YES), the control section 41 of the host computer 16 generates the random number as the inherent information by the random number generating section 46 (step S7).

The random number as this inherent information is data for the host device 14 and the respective IC cards (the first IC card 11 and the second IC card 12) to perform the authentication processing by the key information. That is, in the authentication processing, each IC card encrypts the random number as the inherent information by the key information, and the host device decrypts the random number as the inherent information encrypted with the key information by each IC card.

When the random number generating section 46 generates the random number as the inherent information, the control section 41 of the host computer 16 stores the generated random number in the RAM 42 (step S8). Moreover, the control section 41 transmits the random number as the inherent information to the first IC card 11 (step S9).

In this case, the control section 41 transmits, to the first IC card 11, the data including the inherent information as, for example, a request (authentication request) command for encryption with respect to the first IC card 11. That is, the control section 41 supplies the data including the inherent information to the IC card reader and writer 15 via the first interface 47. After the data including the random number as the inherent information is supplied from the host computer 16, the control section 33 of the IC card reader and writer 15 modulates the data by the modulation/demodulation circuit section 32, and transmits the data as a radio wave from the transmission/reception antenna section 31 to the first IC card 11.

When the random number as the inherent information is transmitted from the host device 14 to the first IC card 11, the first IC card 11 receives the random number as the inherent information transmitted from the host device 14 (step S10).

In this case, in the first IC card 11, the transmission/reception antenna section 21 receives the radio wave transmitted from the host device 14, and the modulation/demodulation circuit section 23 demodulates the radio wave. The data demodulated by the modulation/demodulation circuit section 23 is supplied to the control section 24. For example, the data demodulated by the modulation/demodulation circuit section 23 is an encryption request command including the random number as the inherent information.

The data including the random number as the inherent information is supplied to the control section 24 of the first IC card 11, and the control section encrypts the random number as the inherent information included in the data received from the host device 14 by use of the first key information stored beforehand in the memory section 25 (step S11).

The first key information is used by the host device 14 in authenticating the first IC card 11, and the key information is inherent in the first IC card 11.

On encrypting the inherent information by the first key information, the control section 24 of the first IC card 11 transmits, to the second IC card 12, the inherent information encrypted with the first key information (step S12).

In this case, the control section 24 of the first IC card 11 supplies, to the modulation/demodulation circuit section 23, the data including the inherent information encrypted with the first key information as, for example, an encryption request (authentication request) command with respect to the second IC card. Accordingly, the modulation/demodulation circuit section 23 of the first IC card 11 modulates the data, and the transmission/reception antenna section 21 transmits the data as a radio wave.

When the first IC card 11 transmits the inherent information encrypted with the first key information, the second IC card 12 receives the inherent information encrypted with the first key information from the first IC card 11 (step S13).

In this case, in the second IC card 12, the transmission/reception antenna section 21 receives the radio wave transmitted from the first IC card 11, and the modulation/demodulation circuit section 23 demodulates the radio wave. There is supplied to the control section 24 the data including the inherent information encrypted with the first key information and demodulated by the modulation/demodulation circuit section 23. For example, the data demodulated by the modulation/demodulation circuit section 23 is the encryption request command including the inherent information encrypted by the first IC card 11 using the first key information.

The data including the inherent information encrypted with the first key information is supplied to the control section 24 of the second IC card 12, and the control section further encrypts the inherent information encrypted with the first key information and included in the data received from the first IC card 11 by use of second key information stored beforehand in the memory section 25 (step S14).

According to this processing, the inherent information encrypted with the first key information is further encrypted with the second key information. It is to be noted that the second key information is for use by the host device 14 in authenticating the second IC card 12, and the key information is inherent in the second IC card 12.

When the inherent information encrypted with the first key information is further encrypted with the second key information, the control section 24 of the second IC card 12 transmits, to the first IC card 11, information (inherent information encrypted with the first and second key information) obtained by further encrypting the inherent information encrypted with the first key information by use of the second key information (step S15).

In this case, the control section 24 of the second IC card 12 allows the modulation/demodulation circuit section 23 to modulate the data including the inherent information encrypted with the first and second key information as, for example, a response to the encryption request command transmitted from the first IC card 11 in the step S12. The data is transmitted as a radio wave by the transmission/reception antenna section 21.

When the inherent information encrypted with the first and second key information is transmitted from the second IC card 12, the first IC card 11 receives data including the inherent information encrypted with the first and second key information from the second IC card 12 (step S16).

In this case, in the first IC card 11, the transmission/reception antenna section 21 receives the radio wave transmitted from the second IC card 12, and the modulation/demodulation circuit section 23 demodulates the radio wave. The data demodulated by the modulation/demodulation circuit section 23 is supplied to the control section 24. Here, the data demodulated by the modulation/demodulation circuit section 23 is, for example, a response from the second IC card with respect to the encryption request command transmitted in the step S12.

On receiving the inherent information encrypted with the first and second key information from the second IC card 12, the first IC card 11 transmits, to the host device 14, the inherent information encrypted with the first and second key information and transmitted from the second IC card 12 (step S17).

In this case, the control section 24 of the first IC card 11 allows the modulation/demodulation circuit section 23 to modulate the data including the inherent information encrypted with the first and second key information and transmitted from the second IC card 12 as, for example, a response to the encryption request command transmitted from the host device 14 in the step S9. The transmission/reception antenna section 21 transmits the data as the radio wave.

When the first IC card 11 transmits the data including the inherent information encrypted with the first and second key information, the host device 14 receives, from the first IC card 11, the inherent information encrypted with the first and second key information (step S18).

In this case, in the host device 14, the transmission/reception antenna section 31 of the IC card reader and writer 15 receives the radio wave transmitted from the first IC card 11, and the modulation/demodulation circuit section 32 demodulates the radio wave. The data demodulated by the modulation/demodulation circuit section 32 includes the inherent information encrypted with the first and second key information. For example, here, the data demodulated by the modulation/demodulation circuit section 32 is a resistance from the first IC card to the encryption request command transmitted in the step S9.

Moreover, the data demodulated by the modulation/demodulation circuit section 32 of the IC card reader and writer 15 is supplied to the control section 41 of the host computer 16 via the interface 34 of the IC card reader and writer 15 and the first interface 47 of the host computer 16. In the host computer 16, information (inherent information encrypted with the first and second key information) received from the first IC card 11 is stored in the RAM 42 or the like.

When the information (inherent information encrypted with the first and second key information) received from the first IC card 11 is stored in the RAM 42, the control section 41 of the host computer 16 decrypts the information from the first IC card 11 by use of the key information for decryption (step S19).

It is assumed that the key information for decryption is stored in the database 45a or the like in association with the ID information of each IC card. Therefore, the control section 41 of the host computer 16 decrypts the information (inherent information encrypted with the first and second key information and transmitted from the first IC card 11) received in the step S18 by use of the decryption key information corresponding to the ID information (ID information of the first IC card 11) received in the step S4.

It is to be noted that the key information for decryption may be, for example, the first key information stored in the first IC card 11 and the second key information stored in the second IC card 12. In this case, the first and second key information are stored as the decryption key information corresponding to the ID information of the first IC card 11 in the database 45a.

When the information received from the first IC card 11 is decrypted, the control section 41 of the host computer 16 collates the demodulated information with the inherent information (inherent information stored in the RAM 42 in the step S8) as source information of encryption, generated in the step S7, to thereby judge whether or not a predetermined relation is established between the information (step S20). For example, when the first key information stored in the first IC card and the second key information stored in the second IC card are registered as the decryption key information corresponding to the ID information of the first IC card 11 in the database 45a, the control section 41 judges whether or not the decrypted information agrees with the inherent information generated in the step S7.

In a case where it is judged that a predetermined relation is established between the decrypted information and the inherent information generated in the step S7 as a result of judgment in the step S20 (e.g., in a case where the decrypted information agrees with the inherent information) (step S20, YES), the control section 41 judges that the information received from the first IC card 11 is right information. This means that the first IC card 11 and the second IC card 12 which have encrypted the inherent information generated in the step S7 are judged to be right IC cards. In other words, in a case where the predetermined relation is established between the decrypted information and the inherent information generated in the step S7 as a result of judgment in the step S20 (step S20, YES), the control section 41 judges that the authentications of the host device 14 as well as the first IC card 11, and the host device 14 as well as the second IC card 12 are successful.

In a case where it is judged that the authentications of the first and second IC cards 11, 12 are successful in this manner, the control section 41 of the host computer 16 permits the entrance/exit of the person who possesses the first and second IC cards 11, 12. In this case, the control section 41 of the host computer 16 transmits to the door control section 17 a control signal for opening the door 13. On receiving this control signal, the door control section 17 opens the door 13 (step S21). Accordingly, in the present entrance/exit management system, there is obtained a state in which the entrance/exit of the person who possesses the first and second IC cards 11, 12 is possible.

Moreover, in a case where any predetermined relation is not established between the decrypted information and the inherent information generated in the step S7 as a result of the judgment (step S20, NO), the control section 41 of the host computer 16 judges that the entrance/exit of the person who possesses the first and second IC cards 11, 12 is not permitted. In this case, the control section 41 of the host computer 16 allows the door 13 to remain closed (step S6). In this case, the control section 41 of the host computer 16 ends the processing, and returns to a state of the step S1 to transmit an application request.

As described above, the entrance/exit management system adopts a communication mode in which the host device 14 communicates with the only first IC card 11 and the first IC card 11 communicates with the second IC card 12. The host device 14 acquires the inherent information encrypted by the first IC card 11 and the second IC card 12 via the first IC card 11, and the device decrypts the inherent information encrypted by the first IC card 11 and the second IC card 12 to thereby authenticate the first IC card 11 and the second IC card 12.

Consequently, it is possible to reduce times of communications between the host device 14 and the IC cards 11, 12 as authentication objects. As a result, high security can be realized. Moreover, it is possible to realize an increase of an efficiency or a speed of the authentication processing with respect to a plurality of IC cards. Furthermore, in the host device 14, it is not necessary to manage the information for the authentication processing with respect to all the IC cards 11, 12, and the device may hold information necessary for the authentication processing in association with the first IC card. As a result, the host device 14 can efficiently manage the information, and the information management is facilitated.

Moreover, as a modification of the above embodiment, the present invention is applicable to processing to authenticate three or more IC cards (mediums for authentication). In a case where three or more IC cards 11, 12b, 12c, . . . , 12n are authenticated, in principle, in the same manner as in the above embodiment, the respective IC cards successively encrypt inherent information such as a random number generated by the host device 14, and the cards may be finally authenticated based on information obtained by the host device in decrypting the information encrypted by all of the IC cards. It is to be noted that in this case, in the database 45a, the decryption key information corresponding to the key information (second, third, . . . , N-th key information) for use in encryption processing in the respective IC cards 12b, 12c, . . . , 12n are associated with the ID information of the first IC card 11, and stored.

Furthermore, as modes for realizing the authentications of three or more IC cards, for example, there are considered: a method (first method) in which a plurality of IC cards successively performs processing in a tandem manner (in series) with respect to a specific IC card that communicates with the host device 14; and a method (second method) in which a plurality of IC cards successively performs processing in a tandem manner (in parallel) with respect to a specific IC card that communicates with the host device 14.

First, the first method will be described as a realizing mode in a case where the host device authenticates three or more IC cards.

FIG. 8 is an explanatory view showing a processing example based on the first method.

In this first method, as shown in FIG. 8, a plurality of IC cards 12b, 12c, . . . , 12n other than the first IC card 11 perform encryption processing and transmit and receive the encrypted information in a chain manner (in series), respectively. That is, the IC card which directly communicates with the host device 14 is the first IC card 11 only in the same manner as in the above processing example. The plurality of IC cards 12b, 12c, . . . , 12n other than the first IC card 11 successively transmit the encrypted information to the next IC card. Furthermore, the last IC card 12n transmits to the first IC card 11 the information successively encrypted by all of the IC cards. The first IC card 11 transfers to the host device the information encrypted by all of the IC cards.

It is to be noted that in this case, the last IC card 12n needs to judge whether or not the IC card itself is the last. Here, for example, the respective IC cards 12b, 12c, . . . , 12n may judge whether or not there exists another IC card that does not perform the encryption processing. The information for identifying the IC card requiring the encryption processing may be transmitted from the first IC card 11 to the IC card 12b or 12n.

This example will be described in association with the above-described operation example. Processing similar to that of the steps S1 to S21 is performed except that all the IC cards 12b, 12c, . . . , 12n other than the first IC card 11 execute the processing similar to that of the steps S13 to S15. That is, each IC card encrypts the information received from another IC card to transmit the information to the next IC card.

As a typical example, it is assumed that the IC cards 12b and 12c exist in addition to the first IC card 11. In this case, the IC card 12b receives the inherent information encrypted by the first IC card 11 in the same manner as in the step S13. On receiving the inherent information encrypted by the first IC card 11 in the step S13, the IC card 12b encrypts the information received by the step S13 in the same manner as in the step S14. This encrypted information is transmitted from the IC card 12b to the next IC card 12c as the processing of the step S15.

Furthermore, the IC card 12c receives the information encrypted by the IC card 12b as processing similar to that of the step S13. On receiving the information encrypted by the IC card 12b, the IC card 12c encrypts the information received from the IC card 12b in the same manner as in the step S14. The encrypted information is the information encrypted by all of the IC cards. Therefore, the IC card 12c transmits the encrypted information to the first IC card 11. When this information is transmitted to the first IC card 11, processing similar to that of the steps S16 to S21 is performed.

According to such first method, entrance/exit management can be realized based on the authentications of three or more IC cards.

Next, the second method will be described as a realizing mode in a case where the host device authenticates three or more IC cards.

Figure 9:
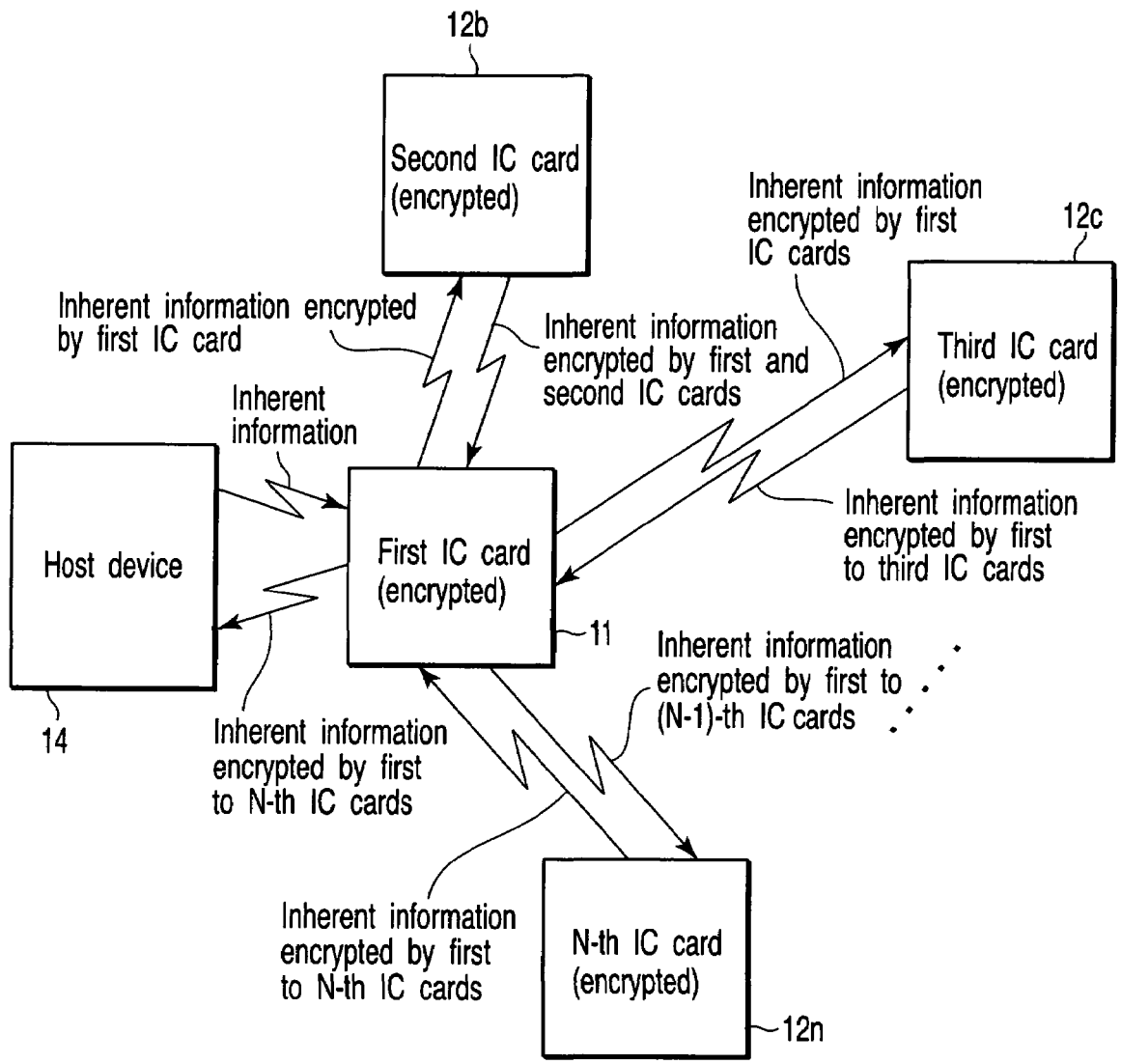
FIG. 9 is an explanatory view showing a processing example based on a second method for authenticating three or more IC cards by the host device.

FIG. 9 is an explanatory view showing a processing example based on the second method.

In this second method, as shown in FIG. 9, a plurality of IC cards 12b, 12c, . . . , 12n other than the first IC card 11 perform encryption processing and transmit and receive the encrypted information in an independent manner (in series with the first IC card), respectively. That is, the IC card which directly communicates with the host device 14 is the first IC card 11 only in the same manner as in the above processing example. The plurality of IC cards 12b, 12c, . . . , 12n other than the first IC card 11 do not directly transmit or receive data with one another, and they transmit and receive data with respect to the first IC card 11, respectively. Therefore, the first IC card 11 successively receives the encrypted information from the respective IC cards 12b, 12c, . . . , 12(n−1), and transmits the received encrypted information to the next IC cards 12c, . . . , 12n. Furthermore, on receiving the encrypted information from the last IC card 12n, the first IC card 11 transfers to the host device the information successively encrypted by all of the IC cards.

It is to be noted that in this case, the first IC card 11 needs to identify the last IC card 12n. Here, for example, the first IC card 11 may retain beforehand information for identifying another IC card requiring the encryption processing. The information for identifying the IC card requiring the encryption processing may be received from the host device 14 together with the inherent information.

This example will be described in association with the above-described operation example. In the second method, processing similar to that of the steps S13 to S16 may be executed between the first IC card 11 and all of the IC cards 12b, 12c, ..., 12n. Processing other than this processing can be realized by processing similar to that of the steps S1 to S21. That is, every time the first IC card 11 receives the encrypted information from each IC card, the first IC card transmits the received encrypted information to the next IC card.

For example, it is assumed that the IC cards 12b and 12c exist in addition to the first IC card 11. In this case, the first IC card 11 receives the information encrypted by the IC card 12b in the same processing as that of the steps S1 to S16. Then, the first IC card 11 judges that the next IC card 12c exists, and transmits the information encrypted by the IC card 12b to the IC card 12c. On the other hand, the IC card 12c encrypts the information received from the first IC card 11, and transmits the encrypted information to the first IC card 11 in the same manner as in the steps S13 to S15.

On receiving the information encrypted by the IC card 12c, the first IC card 11 judges that the IC card 12c is the last IC card. According to this judgment, the first IC card 11 transfers the information encrypted by the IC card 12c to the host device 14. Accordingly, processing similar to that of the steps S17 to S21 is performed.

According to such second method, the entrance/exit management can be realized based on the authentications of three or more IC cards. It is to be noted that in the second method, the first IC card 11 may execute processing similar to that of the steps S13 to S16 together with the plurality of IC cards 12b, 12c, ..., 12n in an arbitrary order.

It is to be noted that the first, second, and third electronic devices are not limited to the above-described contact-less IC cards (radio cards), and the present invention is similarly applicable to, for example, even a case where portable terminal devices are used such as a contact-less IC card, cellular phone, and PDA.

As described above, the present entrance/exit management system adopts the communication mode in which the host device 14 communicates with the only specific first IC card 11 among the plurality of IC cards 11, 12b, 12c, ..., 12n, and the other IC cards 12b, 12c, ..., 12n communicate with the first IC card 11 or with one another. The host device 14 acquires the inherent information successively encrypted by all of the IC cards 11, 12b, 12c, ..., 12n via the first IC card 11, and the device decrypts the inherent information successively encrypted by all of the IC cards to thereby authenticate all of the IC cards 11, 12b, 12c, ..., 12n.

In consequence, it is possible to reduce times of communications between the plurality of IC cards 11, 12b, 12c, ..., 12n as the authentication objects and the host device 14. As a result, high security can be realized. Moreover, it is possible to improve an efficiency or increase a speed in the authentication processing with respect to the plurality of IC cards. Furthermore, the host device 14 does not have to manage information for the authentication processing with respect to all of the IC cards 11, 12b, 12c, ..., 12n, and the device may associate the information required for the authentication processing with the first IC card 11, and retain the information. As a result, the host device 14 can efficiently manage the information, and the information management is facilitated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An authentication system comprising:
a first electronic device; a second electronic device; and a host device,
the first electronic device including:
a first memory which stores first key information;
a first encryption processing section which encrypts inherent information transmitted from the host device by use of the first key information stored in the first memory;
a first transmitting section which transmits to the second electronic device the inherent information encrypted with the first key information by the first encryption processing section; and
a transfer section which transfers to the host device the information transmitted from the second electronic device and obtained by encrypting the inherent information encrypted with the first key information further by the second electronic device,
the second electronic device including:
a second memory which stores second key information;
a second encryption processing section which encrypts the inherent information transmitted from the first electronic device and encrypted with the first key information by use of the second key information stored in the second memory; and
a second transmitting section which transmits to the first electronic device the information encrypted with the second key information by the second encryption processing section,
the host device including:
a storage section which stores key information for decryption in association with the first electronic device;
a third transmitting section which transmits the inherent information to the first electronic device;
a decryption processing section which decrypts information transferred from the first electronic device and obtained by encrypting the inherent information by the first and second electronic devices by use of the decryption key information stored in association with the first electronic device in the storage section; and
an authentication processing section which authenticates the first and second electronic devices based on the information decrypted by the decryption processing section and the inherent information.

2. The authentication system according to claim 1, wherein the first electronic device and the second electronic device are contact-less IC cards which communicate with the outside by radio communication.

3. The authentication system according to claim 1, further comprising:
a third electronic device including: a third memory which stores third key information; a third encryption processing section which encrypts the inherent information encrypted with the first and second key information by use of the third key information stored in the third memory; and a fourth transmitting section which transmits to the first electronic device the information encrypted with the third key information by the third encryption processing section, wherein the second transmitting section of the second electronic device transmits to the third electronic device the information encrypted with the second key information by the second encryption processing section, the transfer section of the first electronic device transfers to the host device the information transmitted from the second electronic device and obtained by encrypting the inherent information encrypted with the first and second key information further by use of the third key information, and the authentication processing section of the host device authenticates the first electronic device, the second electronic device, and the third electronic device based on the information decrypted by the decryption processing section and the inherent information.

4. The authentication system according to claim 1, further comprising:

a third electronic device including: a third memory which stores third key information; a third encryption processing section which encrypts the inherent information transmitted from the first electronic device and encrypted with the first and second key information by use of the third key information stored in the third memory; and a fourth transmitting section which transmits to the first electronic device the information encrypted with the third key information by the third encryption processing section, the first electronic device further comprising:

a second transfer section which transfers to the third electronic device the inherent information transmitted from the second electronic device and encrypted with the first and second key information, wherein the transfer section of the first electronic device transfers to the host device the information transmitted from the third electronic device ad obtained by encrypting the inherent information encrypted with the first and second key information further by use of the third key information, the decryption processing section of the host device decrypts the information transferred from the first electronic device and obtained by encrypting the inherent information encrypted with the first and second key information further by use of the third key information based on the decryption key information stored in association with the first electronic device in the storage section, and the authentication processing section of the host device authenticates the first electronic device, the second electronic device, and the third electronic device based on the information decrypted by the decryption processing section and the inherent information.

5. An authentication method for use in a system comprising a first electronic device, a second electronic device, and a host device, the method comprising:

transmitting inherent information from the host device to the first electronic device;

encrypting, by the first electronic device, the inherent information transmitted from the host device by use of first key information stored in a memory of the first electronic device;

transmitting the inherent information encrypted with the first key information from the first electronic device to the second electronic device;

encrypting, by the second electronic device, the inherent information transmitted from the first electronic device and encrypted with the first key information by use of second key information stored in a memory of the second electronic device;

transmitting, from the second electronic device to the first electronic device, information obtained by encrypting the inherent information encrypted with the first key information further with the second key information;

transmitting, from the first electronic device to the host device, information transmitted from the second electronic device and obtained by encrypting the inherent information encrypted with the first key information further by the second electronic device;

decrypting, by the host device, information transmitted from the first electronic device and encrypted with the first and second key information by use of decryption key information stored in association with the first electronic device in a storage section of the host device; and authenticating the first electronic device and the second electronic device based on the information decrypted with the key information for decryption and the inherent information.

6. The authentication method according to claim 5, further comprising:

encrypting, by a third electronic device, the inherent information transmitted from the second electronic device and encrypted with the first and second key information by use of third key information stored in a memory of the third electronic device; and transmitting to the first electronic device information obtained by encrypting the inherent information encrypted with the first and second key information by use of the third key information stored in the memory of the third electronic device, the transmitting by the second electronic device being transmitting to the third electronic device the information encrypted with the second key information, the transferring by the first electronic device being transferring to the host device the information transmitted from the third electronic device and obtained by encrypting the inherent information encrypted with the first and second key information further by use of the third key information, the authenticating by the host device being authenticating the first electronic device, the second electronic device, and the third electronic device based on the information decrypted and the inherent information.

7. The authentication method according to claim 5, further comprising:

encrypting, by a third electronic device, the inherent information transmitted from the second electronic device and encrypted with the first and second key information by use of third key information stored in a memory of the third electronic device;

transmitting, to the first electronic device, information obtained by encrypting the inherent information encrypted with the first and second key information by use of the third key information stored in the memory of the third electronic device; and transferring, from the first electronic device to the third electronic device, the inherent information transmitted from the second electronic device and encrypted with the first and second key information, the transferring from the first electronic device to the host device being transferring to the host device the information transmitted from the third electronic device and obtained by encrypting the inherent information encrypted with the first and second key information further by use of the third key information, the decrypting by the host device being decrypting the information obtained by encrypting the inherent information transferred from the first electronic device and encrypted with the first and second key information further by use of the third key information based on decryption key information stored in association with the first electronic device in a storage section of the host device, the authenticating by the host device being authenticating the first electronic device, the second electronic device, and the third electronic device based on the information decrypted with the key information for decryption and the inherent information.

8. An entrance/exit management system comprising:

a first electronic device; a second electronic device; and a host device, the first electronic device including:

a first memory which stores first key information;

a first encryption processing section which encrypts inherent information transmitted from the host device by use of the first key information stored in the first memory;

a first transmitting section which transmits to the second electronic device the inherent information encrypted with the first key information by the first encryption processing section; and a transfer section which transfers to the host device the information transmitted from the second, electronic device and obtained by encrypting the inherent information encrypted with the first key information further-by the second electronic device, the second electronic device including:

a second memory which stores second key information;

a second encryption processing section which encrypts the inherent information transmitted from the first electronic device and encrypted with the first key information by use of the second key information stored in the second memory; and a second transmitting section which transmits to the first electronic device the information encrypted with the second key information by the second encryption processing section, the host device including:

a storage section which stores key information for decryption in association with the first electronic device;

a third transmitting section which transmits the inherent information to the first electronic device;

a decryption processing section which decrypts information transferred from the first electronic device and obtained by encrypting the inherent information by the first and second electronic devices by use of the decryption key information stored in association with the first electronic device in the storage section;

an authentication processing section which authenticates the first and second electronic devices based on the information decrypted by the decryption processing section and the inherent information; and an opening and closing control section which opens and closes a gate for entrance and exit based on an authentication result by the authentication processing section.

9. The entrance/exit management system according to claim 8, wherein the first electronic device and the second electronic device are contact-less IC cards which communicate with the outside by radio communication.

10. The entrance/exit management system according to claim 8, further comprising:

a third electronic device including: a third memory which stores third key information; a third encryption processing section which encrypts the inherent information encrypted with the first and second key information by use of the third key information stored in the third memory; and a fourth transmitting section which transmits to the first electronic device the information encrypted with the third key information by the third encryption processing section, wherein the second transmitting section of the second electronic device transmits to the third electronic device the information encrypted with the second key information by the second encryption processing section, the transfer section of the first electronic device transfers to the host device the information transmitted from the second electronic device and obtained by encrypting the inherent information encrypted with the first and second key information further by use of the third key information, and the authentication processing section of the host device authenticates the first electronic device, the second electronic device, and the third electronic device based on the information decrypted by the decryption processing section and the inherent information.

11. The entrance/exit management system according to claim 8, further comprising:

a third electronic device including: a third memory which stores third key information; a third encryption processing section which encrypts the inherent information transmitted from the first electronic device and encrypted with the first and second key information by use of the third key information stored in the third memory; and a fourth transmitting section which transmits to the first electronic device the information encrypted with the third key information by the third encryption processing section, the first electronic device further comprising: a second transfer section which transfers to the third electronic device the inherent information transmitted from the second electronic device and encrypted with the first and second key information, wherein the transfer section of the first electronic device transfers to the host device the information transmitted from the third electronic device and obtained by encrypting the inherent information encrypted with the first and second key information further by use of the third key information, the decryption processing section of the host device decrypts the information transferred from the first electronic device and obtained by encrypting the inherent information encrypted with the first and second key information further by use of the third key information based on the decryption key information stored in association with the first electronic device in the storage section, and the authentication processing section of the host device authenticates the first electronic device, the second electronic device, and the third electronic device based on the information decrypted by the decryption processing section and the inherent information.

* * * * *